July 3, 1951  D. E. LIPFERT  2,558,970
SEAL FOR ROTARY FUEL PUMPS
Filed Feb. 10, 1945  2 Sheets-Sheet 1
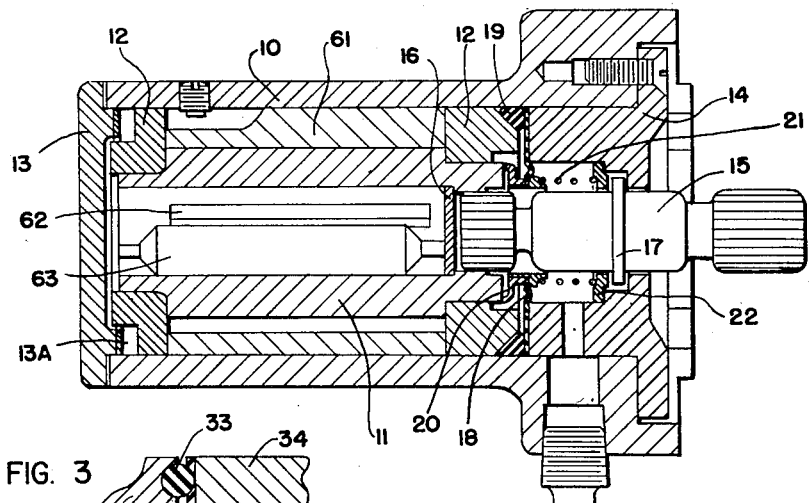
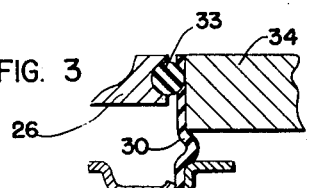
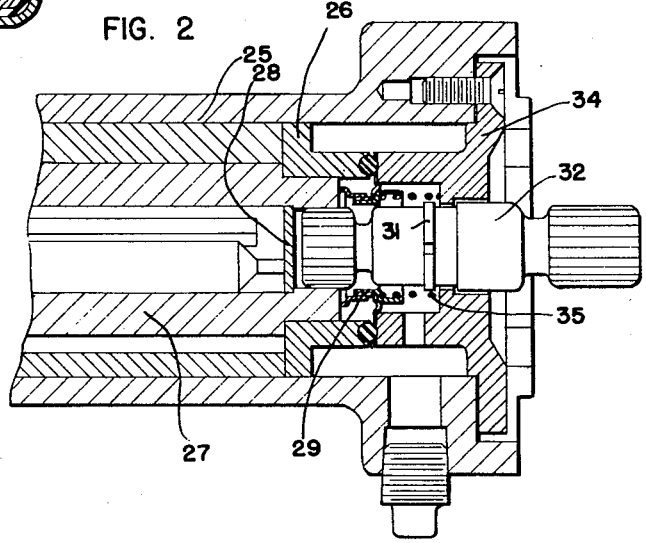
INVENTOR.
DONALD E. LIPFERT
BY Lester W Clark
AGENT July 3, 1951

D. E. LIPFERT 2,558,970

SEAL FOR ROTARY FUEL PUMPS

Filed Feb. 10, 1945

INVENTOR.
DONALD E. LIPFERT
BY
*Lester W Clark*
AGENT

Patented July 3, 1951

2,558,970

UNITED STATES PATENT OFFICE 2,558,970

SEAL FOR ROTARY FUEL PUMPS

Donald E. Lipfert, Meriden, Conn., assignor, by mesne assignments, to Niles-Bement-Pond Company, West Hartford, Conn., a corporation of New Jersey Application February 10, 1945, Serial No. 577,227

12 Claims. (Cl. 103—136)

This invention relates to rotary pumps and particularly to pumps of this type having rotatable vane actuating impellers.

An object of the invention is to provide improved sealing means for the driving end of the pump to prevent fluid from escaping past the driving shaft and from the casing.

Another object is to provide a seal for a rotating structure subject to different pressures on opposite sides of said seal, wherein the seal is balanced so that the difference of pressures does not tend to separate the two sealing surfaces.

Another object of the present invention is to provide a seal for a rotating shaft including a seal member rotating with said shaft and a cooperating non-rotating seal member, means for permitting relative longitudinal movement of the seal members, and means for preventing the difference in pressures on opposite sides of the seal from causing such longitudinal movement.

A further object of the present invention is to provide, in a device rotatable about a fixed axis and driven by a shaft which is tiltable and movable longitudinally with respect to the driven device, improved sealing means for preventing the leakage of fluid past said shaft.

A feature that enables the above object to be obtained is that a sealing ring is flexibly mounted within one end of the casing and adapted to engage directly against an end face of the rotary impeller or a collar or other member rigidly attached to and rotating with the impeller.

Another feature of importance is that the sealing ring may be flexibly mounted either by an impervious flexible diaphragm or by a bellows so that the sealing ring may adjust itself axially and angularly in any direction so that at all times it will bear uniformly against the end face of the impeller or collar on the impeller.

With the above and other objects in view, the invention includes the features of construction and operation set forth in the following specification and illustrated in the accompanying drawings.

In the accompanying drawings annexed hereto and forming a part of this specification, I have shown the invention embodied in a typical form of fuel transfer pump for aircraft engines but it will be understood that the invention can be otherwise embodied and that the drawings are not to be construed as defining or limiting the scope of the invention, the claims appended to this specification being relied upon for that purpose.

In the drawings:

Figure 1 is a longitudinal sectional view thru a rotary pump showing one form of seal made according to the present invention.

Figure 2 is a similar view showing a slightly different modification of the seal shown in Figure 1.

Figure 3 is a detail of a portion of the seal shown in Figure 2 drawn upon an enlarged scale.

Figure 4:
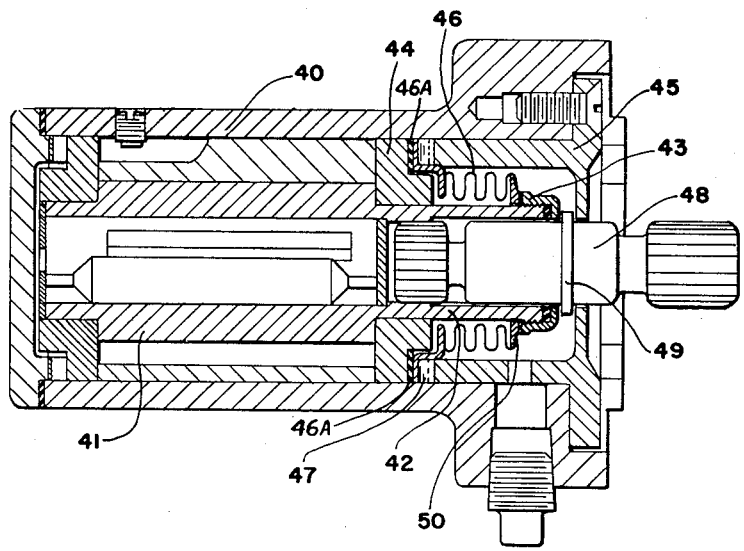
Figure 4 is a longitudinal sectional view of another form of seal in which a bellows is employed for flexibly mounting the sealing ring.

In the above mentioned drawings there have been shown several embodiments of the invention which are now deemed preferable, but it is to be understood that changes and modifications may be made within the scope of the appended claims without departing from the spirit of the invention.

Briefly, and in its preferred aspect, the invention may include the following principal parts: First, a pump casing; second, a rotor mounted therein preferably of the type having radially disposed vanes extending therefrom; third, a driving shaft connected at one end to the rotor and extending from one end of the casing; fourth, a flexibly supported sealing ring bearing against an end surface of the impeller or of a member fixed thereto; and fifth, resilient means to maintain the sealing ring in position against the end surface so that the driving end of the pump will be maintained sealed.

Referring more in detail to the figures of the drawing, and first to Figure 1, it will be seen that a casing 10 is provided with a rotor 11 mounted therein and retained in axial position therein by means of bearings 12 fitting against the ends thereof. As shown, one end of the casing 10 may be closed by a cap member 13 secured to the end of the casing. A corrugated annular leaf spring 13A is provided between cap 13 and bearing 12 to hold the assembled parts tightly together. The opposite or driving end of the pump is closed by an annular closure member 14 thru which the driving shaft 15 extends and by which the bearing 12 is retained in position against the impeller. The rotor turns in a hollow liner 61, whose inner surface is eccentric with respect to the axis of rotor 11. The rotor is slotted to receive vanes, one of which is shown at 62, which displace fluid in the space between the rotor 11 and the liner 61. A pin 63 holds the vanes in contact with liner 61. The rotor 11 in pumps of this type is hollow to permit the movement of the vanes therein. A sealing washer 16 is pressed, as shown, within the central opening of the rotor against an abutment formed therein at the driving end of the rotor.

Connected to one end of the rotor, preferably by splines, as shown, to permit limited tilting relative to the rotor, is the driving shaft 15. This shaft, in the form of the invention shown in Figure 1, has flange 17 thereon at an intermediate point. The driving shaft 15 also is provided with longitudinal splines at its outer end by means of which it may be rotated by any preferred driving means.

Secured within the driving end of the casing 10 is the end plate or closure member 14 suitably secured in fixed position therein and, as shown, clamping the periphery of a flexible impervious diaphragm 18 against a sealing grommet 19 disposed between the bearing 12 and the diaphragm 18. If desired, the diaphragm 18 might be bonded to the other stationary parts. Supported centrally by the impervious diaphragm 18 is a sealing ring 20. This ring, as shown in Figure 1, comprises two members telescopically pressed together and having the diaphragm tightly clamped between abutting surfaces of these members. The sealing ring 20 is large enough to surround the driving shaft 15 and is normally resiliently forced in a direction for its end face to contact the end face of the impeller. For this purpose a light spring 21 is positioned within the closure member 14. As shown, this spring 21 bears at one end against the sealing ring 20 and at its opposite end is in contact with a loose washer 22 fitting within a recess formed in the end plate or closure member 14. The sealing ring 20 is provided with a peripheral flange extending generally parallel to diaphragm 18 and provided at its outer edge with a rim extending parallel to the axis of rotor 11. The face of this rim contacts the end surface of the rotor. The integral flange 17 on the driving shaft 15 serves to prevent accidental withdrawal of the driving member and permits the shaft to be assembled from the inner side of this closure member 14 prior to placing the loose washer 22 and the sealing ring retaining spring 21 in their places.

The diaphragm 18 has the pressure inside the casing acting on its left surface and the pressure outside the casing (usually atmospheric pressure) acting on its right surface. Since the interior pressure is higher than the outside pressure, it may be seen that the pressure differential acting on diaphram 18 tends to move sealing ring 20 to the right and break the seal. This tendency is opposed by the same pressure differential acting in the opposite direction on the flange portion of ring 20. There the high interior pressure acts on the right surface of the flange and the lower exterior pressure on the left. Therefore, the pressure differential acts to the left on ring 20. The area of ring 20 subject to the pressure differential is preferably made equal to the effective area of diaphragm 18 subject to the same differential, so that the seal is balanced against the pressure differential.

The pump shown in Figures 2 and 3 is generally similar to that shown in Figure 1 in that the casing 25 has bearings 26 at opposite ends, and the central opening thru the impeller is closed by a sealing washer 28 fitted therein. The sealing ring 29, however, is constructed somewhat differently from the one shown in Figure 1 and, as shown, may be made from pressed steel parts, their overlapping or telescoping portions retaining between them the central portion of an impervious diaphragm 30 similar to that employed in the form of the invention shown in Figure 1. In place of an integral flange on the driving shaft for the pump shown in Figure 2 there is provided a split ring washer 31 snapped in position, as shown, at an intermediate portion of the shaft 32 to retain the driving shaft 32 against removal from the casing 25. The outer periphery of the diaphragm 30 is compressed against a sealing grommet 33 bearing against the bearing 26 on one side and on the other side against the end face of closure member 34 generally similar to the closure member shown in Figure 1. A spring 35 housed within the end plate or closure member 34 bears directly against an abutment formed therein at one end and against a face of one of the sealing ring members 29. The spring 35 therefore acts similarly to the spring 21 shown in Figure 1 and resiliently holds a surface of the sealing ring 29 directly against the end face of the rotor 27.

The left sealing ring 29 is provided with a radially extending flange similar to the flange on ring 20 of Figure 1, to balance the pressure differential acting to the right on diaphragm 18.

In the form of the invention shown in Figure 4 the casing 40 and rotor 41 are, as shown, generally similar to those described above except that the driving end of the impeller is extended in the form of a thin sleeve 42 and has mounted thereon in fixed position a collar or ring 43, a side face of which is normal to the axis of rotation of the rotor. The rotor 41 is supported at its driving end by a suitable bearing 44. One end of a bellows 46 is provided with a flange which lies between the bearing 44 and the end plate or closure member 45. A sealing washer 46A, of rubber-like material, is provided between the flange on bellows 46 and the bearing 44. A corrugated annular leaf spring washer 47 between the end plate 45 and the flange on bellows 46 maintains an effective seal between the flange and the bearing 44.

The driving shaft 48 in this form of the invention is provided with an integral flange 49 retaining it against accidental removal and the action of the bellows is to normally but resiliently force the outer end flange 50 of the bellows 46 against the radial face of the collar 43 secured in fixed position on the rotor 41.

Figure 5:
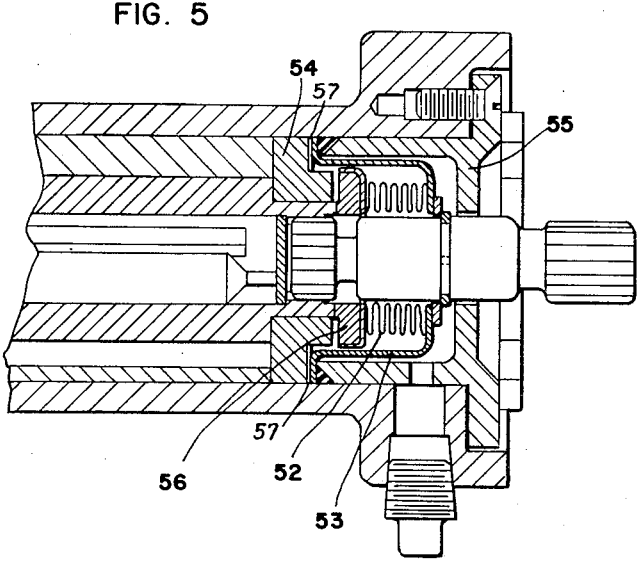
Figure 5 is a view similar to Figure 4 showing a modification thereof.

In Figure 5 is a still further embodiment of the invention which also is provided with a bellows 52 which is placed within a cup-like member 53 having an outwardly extended flange at one end retained in position between the end walls of the rotor supporting bearing 54 and the inner end of the closure member 55. A sealing washer 57 is placed between the flange and the bearing 54. For this purpose the closure member is extended axially to surround the cup member 53. The opposite end of the bellows 52 is provided with a bearing ring 56, the face of which is in contact thru the pressure exerted by the bellows 52 against the end wall of the impeller 57.

What I claim is:

1. A rotary pump comprising a housing containing fluid under pressure, a rotary impeller in said housing having an annular, end sealing surface normal to its axis of rotation, bearings for said impeller fixed in said housing for preventing tilting or endwise movement of said impeller with respect to said housing, a drive shaft for said impeller extending thru an aperture in said housing, a driving connection between said shaft and said impeller permitting tilting and endwise movement of said shaft relative to said impeller, seal means including a ring member and a flexible wall member for preventing leakage of pumped fluid around said shaft to the exterior of said housing, said ring member being positioned in contact with said annular sealing surface and surrounding said shaft, said wall member being attached to said ring member and extending between said ring member and said housing, and spring means biasing said ring member into sealing engagement with said annular sealing surface, said seal means having two opposed surfaces of substantially equal effective area extending normal to said axis and exposed to the pressure within said housing so that said seal means is balanced against said pressure.

2. A rotary pump comprising a housing containing fluid under pressure, a rotary impeller in said housing having an annular, end sealing surface normal to its axis of rotation, bearings for said impeller fixed in said housing for preventing tilting or endwise movement of said impeller with respect to said housing, a drive shaft for said impeller extending thru an aperture in said housing, a driving connection between said shaft and said impeller permitting tilting and endwise movement of said shaft relative to said impeller, seal means including a ring member and a flexible wall member for preventing leakage of pumped fluid around said shaft to the exterior of said housing, said ring member being positioned in contact with said annular sealing surface and surrounding said shaft, said wall member being attached to said ring member and extending between said ring member and said housing, and spring means biasing said ring member into sealing engagement with said annular sealing surface, said seal means having a surface exposed to the pressure within said housing and extending normal to said axis, said last-mentioned surface facing in a direction so that said pressure acts thereon in a direction to hold said ring member in contact with said annular surface.

3. A rotary pump comprising a housing, a rotary impeller in said housing having an annular, end sealing surface normal to its axis of rotation, bearings for said impeller mounted in said housing for preventing tilting or endwise movement of said impeller with respect to said housing, a sealing grommet for sealing a joint between one of said bearings and said housing, a spring holding said one bearing against said sealing grommet, a drive shaft for said impeller extending thru an aperture in said housing, a driving connection between said shaft and said impeller permitting tilting and endwise movement of said shaft relative to said impeller, seal means including a ring member and a flexible wall member for preventing leakage of pumped fluid around said shaft to the exterior of said housing, said ring member being positioned in contact with said annular sealing surface and surrounding said shaft, said wall member being attached to said ring member and extending between said ring member and said housing, and spring means biasing said ring member into sealing engagement with said annular surface.

4. A rotary pump comprising a housing containing fluid under pressure, a rotary impeller in said housing having an annular, end sealing surface normal to its axis of rotation, bearings for said impeller fixed in said housing for preventing tilting or endwise movement of said impeller with respect to said housing, a drive shaft for said impeller extending thru an aperture in said housing, a driving connection between said shaft and said impeller permitting tilting and endwise movement of said shaft relative to said impeller, seal means including a ring member and a flexible wall member for preventing leakage of pumped fluid around said shaft to the exterior of said housing, said ring member being positioned in contact with said annular sealing surface and surrounding said shaft, said wall member being attached to said ring member and extending between said ring member and said housing, and spring means biasing said ring member into sealing engagement with said annular sealing surface, said seal means having a surface exposed to the pressure within said housing and extending normal to said axis, said last-mentioned surface facing in a direction so that said pressure acts thereon in a direction to hold said ring member in contact with said annular sealing surface and having an effective area at least equal to that of any surface on said seal means facing in the opposite direction so that said seal means is balanced against said pressure to the extend that said pressure produces substantially no net force acting on said seal means in a direction to separate said ring member from said annular sealing surface.

5. A rotary pump comprising a housing, a rotary impeller in said housing having an annular, end sealing surface normal to its axis of rotation, bearings for said impeller fixed in said housing for preventing tilting or endwise movement of said impeller with respect to said housing, a drive shaft for said impeller extending thru an aperture in said housing, a driving connection between said shaft and said impeller permitting tilting and endwise movement of said shaft relative to said impeller, and seal means for preventing leakage of pumped fluid around said shaft to the exterior of said housing including a non-rotating ring member sealingly engaging said annular surface and a flexible diaphragm surrounding said shaft and attached to said ring member; the area of said ring member subject to the differential fluid pressure on the opposite sides thereof being equal to the area of said diaphragm subject to the same differential pressure, so that said seal means is balanced against said differential pressure.

6. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly having a sealing surface adapted to slidingly engage said impeller sealing surface and prevent leakage of pumped fluid around said shaft, said seal assembly being movable longitudinally of said axis, and spring means associated with said assembly for biasing it to a position wherein its sealing surface engages said impeller sealing surface, said seal assembly having oppositely facing spaced surfaces extending normal to said axis and exposed on their near sides to the pressure inside of said wall and on their far sides to the pressure outside said wall, said surfaces having their areas substantially equal so that said seal assembly is balanced against said pressure.

7. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly including a non-rotating seal element movable longitudinally of said axis and having a sealing surface adapted to slidingly engage said impeller sealing surface and prevent leakage of pumped fluid around said shaft, and spring means associated with said element for maintaining said sealing surfaces in engagement, said seal assembly having a surface extending normal to said axis and exposed to the pressure on the high pressure side of said wall, said exposed surface facing in a direction so that said pressure applies a force thereto in a direction to maintain said sealing surfaces in contact.

8. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly having a sealing surface adapted to slidingly engage said impeller sealing surface and prevent leakage of pumped fluid around said shaft, said seal assembly being movable longitudinally of said axis, and spring means for maintaining said sealing surfaces in engagement, said seal assembly having oppositely facing spaced surfaces extending normal to said axis and exposed on their near sides to the pressure inside said wall and on their far sides to the pressure outside said wall, said surfaces having their areas so proportioned that said pressure exerts no force on said assembly in a direction to separate said sealing surfaces.

9. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly having a sealing surface adapted to slidingly engage said impeller sealing surface and prevent leakage of pumped fluid around said shaft, said seal assembly being movable longitudinally of said axis, and spring means for maintaining said sealing surfaces in engagement, said seal assembly having oppositely facing spaced surfaces extending normal to said axis and exposed to the pressure on one side of said wall, one of said spaced surfaces facing in a direction so that said pressure acts thereon in a direction to separate said sealing surfaces, and a second of said spaced surfaces facing in a direction so that said pressure acts thereon in a direction to maintain said sealing surfaces in contact, said second surface having an effective area at least equal to that of said first surface so that said seal assembly is balanced against said pressure to the extent that said pressure produces substantially no net force acting on said seal assembly in a direction to separate said sealing surfaces.

10. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly including a non-rotating seal element movable longitudinally of said axis and having a sealing surface adapted to slidingly engage said impeller sealing surface and prevent leakage of pumped fluid around said shaft, and spring means associated with said element for maintaining said sealing surfaces in engagement, said non-rotating seal element having a surface extending normal to said axis and exposed to the pressure on the high pressure side of said wall, said exposed surface facing in a direction so that said pressure applies a force thereto in a direction to maintain said sealing surfaces in contact.

11. A rotary pump comprising a housing with an end wall having different fluid pressures on its opposite sides, a rotary impeller in said housing having an annular, end sealing surface normal to its axis of rotation, a driving shaft for said impeller passing through said wall, a non-rotating seal assembly including a non-rotating seal element movable longitudinally of said axis and having a sealing surface adapted to slidingly engage said impeller sealing surface and prevent leakage of pumped fluid around said shaft, and spring means associated with said seal element for maintaining said sealing surfaces in engagement, said non-rotating seal element having a portion extending substantially normal to said axis and exposed on one side to the pressure on the high pressure side of said wall and on its opposite side to the pressure on the low pressure side of said wall, said normal portion of said element being so constructed and arranged that the difference of said pressures applies a force thereto in a direction to maintain said sealing surfaces in contact.

12. A rotary pump comprising a housing having an end wall, a rotary impeller in said housing having an annular, end sealing surface normal to its axis of rotation, bearings for said impeller mounted in said housing to prevent tilting or endwise movement of said impeller with respect to said housing, a drive shaft for said impeller extending through an aperture in said housing and having an integral flange positioned within said housing and adapted to engage the end wall of said housing to prevent accidental withdrawal of said shaft from said housing, a detachable driving connection between said shaft and said impeller permitting tilting and endwise movement of said shaft relative to said impeller, seal means, including a ring member and a flexible wall member, for preventing leakage of pumped fluid around said shaft to the exterior of said housing, said ring member being positioned in contact with said annular sealing surface when surrounding said shaft, said wall member being attached to said ring member and extending between said ring member and said housing, and spring means biasing said ring member into sealing engagement with said annular surface.

DONALD E. LIPFERT.

REFERENCES CITED

The following references are of record in the file of this patent:

UNITED STATES PATENTS

| Number | Name | Date |
|---|---|---|
| 2,010,930 | Rowe | Aug. 13, 1935 |
| 2,077,881 | Gits | Apr. 20, 1937 |
| 2,191,232 | Heinen | Feb. 20, 1940 |
| 2,209,856 | Smith | July 30, 1940 |
| 2,260,809 | Johnson | Oct. 28, 1941 |
| 2,334,548 | Greenlee | Nov. 16, 1943 |
| 2,348,679 | Groves | May 9, 1944 |
| 2,367,781 | Jacobus | Jan. 23, 1945 |
| 2,379,868 | Curtis | July 10, 1945 |
| 2,382,960 | Compton et al. | Aug. 21, 1945 |
| 2,434,589 | Roth | Jan. 13, 1948 |
| 2,439,241 | Curtis | Apr. 6, 1948 |

FOREIGN PATENTS

| Number | Country | Date |
|---|---|---|
| 26,440 | Netherlands | 1932 |
| 206,806 | Great Britain | 1923 |
| 274,040 | Great Britain | 1928 |